Oct. 19, 1937.    A. T. POTTER    2,096,437
SEAT ADJUSTING DEVICE
Filed Jan. 4, 1934
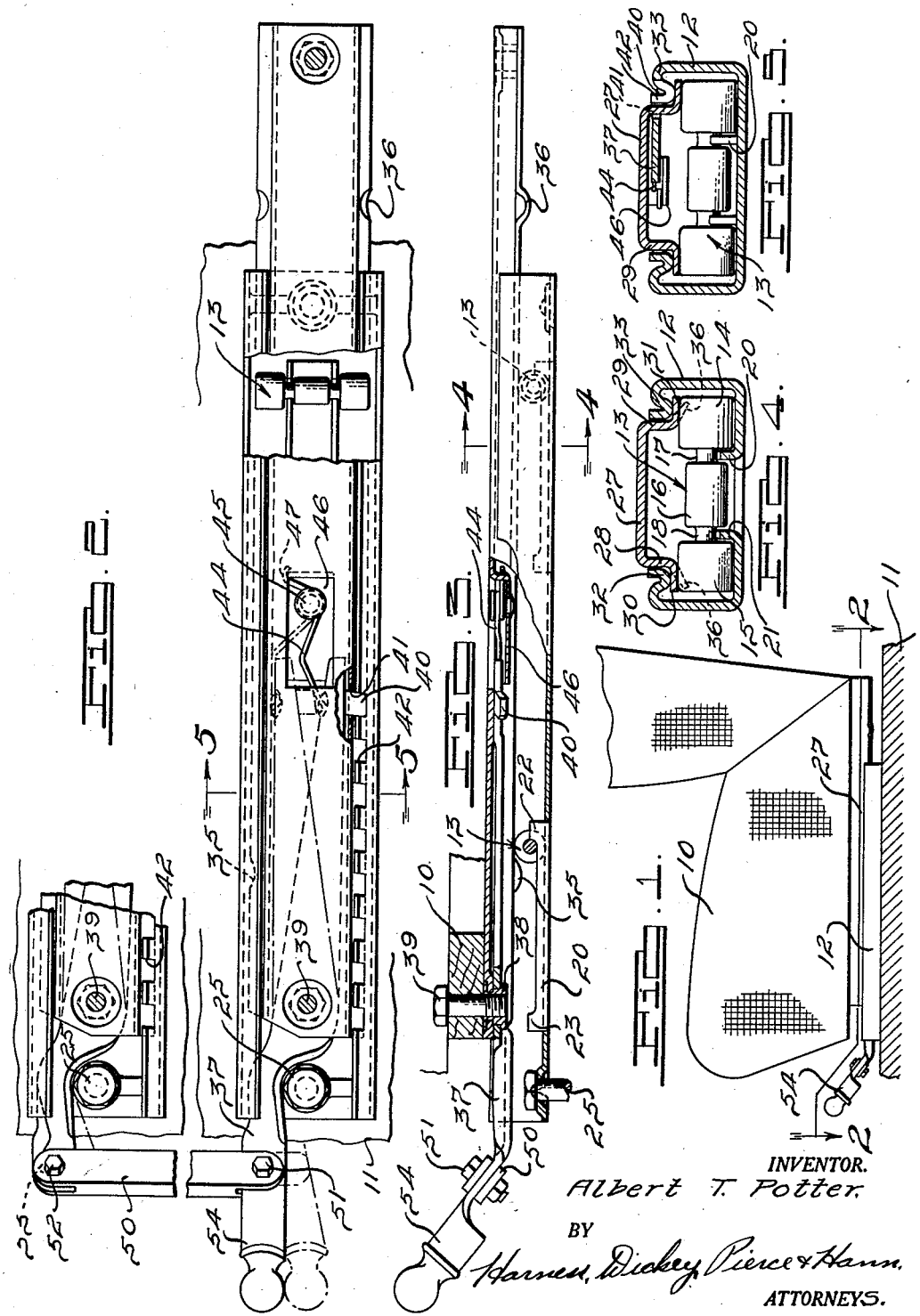
INVENTOR.
Albert T. Potter.
BY
Harness, Dickey, Pierce & Hann.
ATTORNEYS.

Patented Oct. 19, 1937

2,096,437

UNITED STATES PATENT OFFICE 2,096,437

SEAT ADJUSTING DEVICE

Albert T. Potter, Detroit, Mich., assignor to Ainsworth Manufacturing Corporation, a corporation of Michigan Application January 4, 1934, Serial No. 705,185

11 Claims. (Cl. 155—14)

The invention relates to motor vehicles or the like and it has particular relation to a mechanism for controlling the position of one of the seats therein and particularly the seat provided for the driver of the vehicle.

In certain respects the invention is related to my application for patent relating to Seat control mechanism, Serial No. 647,317, filed December 15, 1932, which matured into Patent No. 2,006,149 issued January 25, 1935.

One object of the invention is to provide a simple and inexpensive seat control device which may be installed very easily and which operates very smoothly during adjustment of the seat.

Another object of the invention is to provide a seat adjusting device including rolling supporting elements, which is more stable for the purpose of holding the seat in adjustable position and which provides an improved rolling support therefor.

Other objects of the invention will become apparent from the following description, the drawing relating thereto and from the claims hereinafter set forth.

For a better understanding of the invention reference may be had to the drawing, wherein:

Figure 1 is a fragmentary view showing a movable automobile seat and a seat adjusting device constructed according to one form of the invention.

Fig. 2 is a cross-sectional view on a larger scale taken substantially along the line 2—2 of Fig. 1.

Fig. 3 is an elevational view of the construction shown by Fig. 2 with parts broken away for the purpose of illustrating certain details.

Fig. 4 is a cross-sectional view on a larger scale taken substantially along the line 4—4 of Fig. 3.

Fig. 5 is a cross-sectional view on a larger scale taken substantially along the line 5—5 of Fig. 2.

Referring to Fig. 1, the seat is indicated at 10, and the floor of the automobile is indicated at 11. The seat is mounted for movement forwardly and rearwardly and the invention is particularly concerned with a device for movably supporting the seat for adjustably locking the seat in the desired adjusted position.

Referring to Figs. 2, 3 and 4, for example, the device includes a lower sheet metal channel 12 having a plurality of rollers 13 therein, each of which has end portions 14 and 15 of larger diameter adapted to roll along the base of the channel at opposite sides thereof. The roller also has an intermediate and smaller portion 16 which is spaced from the portions 14 and 15 by annular grooves 17 and 18. The base portion of the channel 12 has laterally spaced, upwardly struck flanges 20 and 21 at each end of the channel and, as shown by Fig. 3 particularly, the upper edges of each of these flanges has shoulders 22 and 23 at opposite ends thereof respectively. The flanges are so located that they coincide with the grooves 17 and 18 in the rollers 13 and the height of each flange between the projections 22 and 23 is such that the grooved portions of the rollers substantially contact with the upper edges of the flanges between the shoulders 22 and 23 while the latter constitutes limiting stops for the rollers. One of the rollers 13 is provided at each end of the channel and is mounted for movement longitudinally of the channel the distance between the shoulders 22 and 23 on the upwardly struck flanges 20 and 21. For securing the channel 12 to the floor 11, front and rear bolts 25 may be used as will readily be appreciated.

The device also includes an upper plate member 27 having downwardly turned edge flanges 28 and 29 which terminate in legs 30 and 31 adapted to engage the end portions 14 and 15 of the rollers. For holding the parts assembled, the legs of the channel 12 are turned inwardly as indicated at 32 and 33 and into engagement with the legs 30 and 31 and the flanges 28 and 29. Preferably, the turned-in edge portions 32 of the channel 12 serve as resilient means for constantly maintaining the legs 30 and 31 of the plate 27 in engagement with the end portions 14 and 15 of the rollers while still permitting an easy movement of the rollers relative to both the channel 12 and the plate member 27. Each of the legs 30 and 31 has longitudinally spaced, downwardly projecting lips 35 and 36 and it will be observed in Fig. 3 that when the upper plate member 27 is moved rearwardly the front lip 35 finally will engage the front roller and will limit further movement of the upper plate member, while the rear lip 36 serves the same purpose in connection with the rear roller when the upper plate member is moved forwardly. Movement of the upper plate member will approximately be twice the longitudinal movement of the rollers owing to the fact that the latter have rolling contact both with the base of the channel 12 and with the upper plate member.

For adjustably locking the seat in position, an operating arm 37 is provided which extends under the upper plate member 27 and is pivotally mounted on a threaded, tubular element 38 that is rigidly fastened to the plate member 27. In this connection it may be noted that the internal threads of the tubular element 38 are adapted to engage a bolt 39 by means of which the seat is secured to the upper plate member at the forward end of the latter. Similar securing means are provided at the rear end of the upper plate member for securing the seat thereto although in this case no pivoted arm is pivoted. The arm 37 tapers rearwardly and at its rear end terminates in a projection 40 which is movable through an opening 41 provided in the flange 29 at the right side of the plate member 27. The projection 40 on the operating arm is adapted to co-operate selectively with notches 42 provided in the inwardly turned portion 33 on the leg of the channel 12 so as to adjustably lock the plate member to the channel and it will be apparent that when the operating arm 37 is pivoted to move the projection 40 out of the notch 42 in which it is disposed, the seat and upper plate member may be moved longitudinally and then, upon release of the arm 37, the projection 40 may be again moved into a coinciding notch. For the purpose of normally holding the arm in such position that the projection 40 is urged into engagement with one of the notches, a spring 44 is provided which presses against the edge of the arm and which is coiled around a pin 45 mounted on a downwardly struck portion 46 of the upper plate member. It will be noted that at the forward edge of the downwardly struck portion 46, a space is provided to permit the spring to project to the under side of the plate and into engagement with the arm. Also in this connection it will be noted that the extreme rear end of the operating arm projects above the portion 46 and that the latter serves as a support or guide for the arm during its movement. The spring at the opposite side of the pin 45 may be hooked around the edge of the portion 46 as indicated at 47 so as to anchor the spring in position.

A similar device may be provided at the opposite edge of the seat and in order to connect the two operating arms for simultaneous movement, a channel connecting bar 50 is provided which is pivotally connected to one operating arm as indicated at 51 and which is pivotally connected to the other operating arm as indicated at 52. In one pivotal connection a slightly elongated slot 53 may be employed preferably in the operating arm so that one arm may have slight movement without moving the other arm. One of the operating arms has a handle 54 so that it may be manually manipulated at the front side of the seat. It is possible in a dual arrangement of this character that the projection 40 on one operating arm will coincide with one of the notches 42 while the projection on the other operating arm will be slightly out of coinciding relation with a notch and in this event it is apparent that the slightly elongated opening 53 will permit the one projection to move into engagement with the notch even though the projection on the other operating arm cannot move into engagement with one of the notches. Ordinarily, this will not occur but in the event it does it has been found that the projection on the one arm which is not exactly in coinciding relation to the notch will shortly coincide with the notch owing to slight movement of the seat so that ultimately both projections engage notches.

The adjusting device described can be manufactured very inexpensively from sheet metal as will be readily understood. By providing the dual type of roller in each of the channels 12, it is apparent that a more stable arrangement is provided which insures greater seat stability and furthermore the seat will be supported by greater roller contact spread over a greater lateral distance and this naturally will enable obtaining a smoother and easier operating arrangement. The device is readily assembled by inserting the rollers into the channels 12 prior to bending over the inturned portions 32 and 33 and then mounting the plate 27 on the rollers and bending over the portions 32 and 33 to lock them in position. After the parts are assembled it is apparent that they cannot be separated by longitudinal movement owing to the provision of the lips 35 and 36 and it is of course apparent that lateral separation is prevented by interengaging portions of the channel and the upper plate member. The rollers will be prevented from undesirable lateral movement by the flanges 20 and 21 and the latter will additionally serve to limit movement of the rollers and consequently movement of the upper plate member. The device provides a very simple, efficient and inexpensive seat controlling mechanism which may be readily installed.

Although only one form of the invention has been illustrated and described in detail, it will be apparent to those skilled in the art that various modifications may be made without departing from the scope of the appended claims.

What is claimed is:

1. In combination with seat and supporting members, of a channel member adapted to be secured to one member, laterally spaced roller means engaging the base of the channel, a plate member having laterally opposed edge portions engaging the roller means at the sides thereof opposite the channel base, and means on the legs of the channel extending over the lateral edges of the plate member for normally holding the parts assembled.

2. A seat controlling device for movably mounting a seat member on a supporting member comprising a channel member adapted to be secured to one member, roller means within and engaging lateral edge portions of the channel base, a plate member adapted to be secured to the other member and having flanges at the lateral sides thereof engaging the sides of said roller means opposite the sides engaged by said channel base and means on the legs of the channel adapted to overlie the flanges on said plate member to retain the same in assembled relation with said channel member.

3. A seat controlling device comprising a channel, rollers in the channel for movement along the base thereof, a plate member engaging the side of the rollers opposite the channel base, means on the legs of the channel and extending over edges of the plate member for holding the latter in position, an arm pivoted on the under side of the plate member for pivotal movement in a plane transversely of but substantially parallel to the plate member, and means on the arm and a leg of the channel for adjustably locking the plate member and channel in longitudinally adjustable positions.

4. A seat controlling device comprising a channel, rollers in the channel for movement along the base thereof, a plate member engaging the side of the rollers opposite the channel base, means on the legs of the channel and extending over edges of the plate member for holding the latter in position, an arm pivoted on the under side of the plate member for pivotal movement in a plane transversely of but substantially parallel to the plate member, and means on the arm and a leg of the channel for adjustably locking the plate member and channel in longitudinally adjustable positions, said means including a projection on the arm and notches on the channel leg for selectively engaging the projection.

5. A seat controlling device for movably mounting a seat member on a supporting member comprising a channel adapted to be secured to one member, a roller within and engaging the channel base, said roller having laterally spaced grooves intermediate its ends, inwardly struck flanges projecting from the channel base and cooperating with the grooves for positioning the roller laterally during movement thereof, and a plate member adapted to be secured to the other member and movable on the roller at the side thereof opposite the channel base.

6. The combination with seat and supporting members, of a channel adapted to be secured to one member, laterally spaced roller means engaging the base of the channel member, a plate at the opposite side of the rollers and having downwardly turned legs resting on the rollers, and means on the legs of the channel and on the plate for holding them assembled while still allowing longitudinal and relative movement thereof.

7. The combination with seat and supporting members, of a channel adapted to be secured to one member, laterally spaced roller means engaging the base of the channel member, a plate at the opposite side of the rollers and having downwardly turned legs terminating in laterally directed flange portions resting on the rollers, and means on the legs of the channel and cooperating with such flanges for holding the parts assembled while still allowing longitudinal and relative movement thereof.

8. The combination with seat and supporting members, of a channel adapted to be secured to one member, laterally spaced roller means engaging the base of the channel member, a plate at the opposite side of the rollers and having downwardly turned legs resting on the rollers, and means on the legs of the channel and on the plate for holding them assembled and substantially preventing relative lateral movement of the channel and plate while still allowing relative and longitudinal movement thereof.

9. In an adjustable seat support, a pair of channel members arranged in telescoping relation, one of said channels having inturned flanges overlying outturned flanges on the other channel, and rollers disposed between the outturned flanges of one of the channels and the base of the other channel to provide for friction-free relative longitudinal movement of said channels.

10. In an adjustable seat support, a pair of channel members arranged in telescoping relation, one of said channels having inturned flanges and the other having outturned flanges, said inturned flanges of the one channel overlying the outturned flanges of the other channel rollers disposed between the outturned flanges of one of said channels and the base of the other, and means carried by one of said channels for locking said channel members in predetermined longitudinal position.

11. In an adjustable seat support, a pair of channel members arranged in telescoping relation, one of said channel members having inturned flanges, the other having outturned flanges, the inturned flanges of one channel overlying the outturned flanges of the other, rollers disposed between said channels bearing against the outturned flanges of one and the base of the other, notches in the side wall of one of said channels and means carried by the other of said channels adapted to engage one of said notches to lock said channels in predetermined longitudinal position.

ALBERT T. POTTER.